(12) United States Patent
Nardi (10) Patent No.: US 6,828,064 B1
(45) Date of Patent: Dec. 7, 2004

(54) ALKALINE CELL HAVING A CATHODE INCORPORATING ENHANCED GRAPHITE

(75) Inventor: John C. Nardi, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/213,544

(22) Filed: Dec. 17, 1998

Related U.S. Application Data (60) Provisional application No. 60/072,269, filed on Jan. 7, 1998.

(51) Int. Cl.$^7$ ............................. H01M 4/50; H01M 4/62
(52) U.S. Cl. ...................................... 429/232; 429/224
(58) Field of Search ............................. 429/224, 229, 429/232; 423/448

(56) References Cited

U.S. PATENT DOCUMENTS

| | | | |
|---|---|---|---|
| 2,734,799 A | 2/1956 | Brooks | 23/209.1 |
| 2,914,383 A | 11/1959 | Ulrich | 23/209.9 |
| 3,389,964 A | 6/1968 | Olstowski | 23/209.1 |
| 3,409,563 A | 11/1968 | Olstowski | 252/506 |
| 3,414,381 A | 12/1968 | Olstowski et al. | 23/209.1 |
| 3,494,382 A | 2/1970 | Shane et al. | 138/129 |
| 3,560,155 A | 2/1971 | Olstowski et al. | 23/209.2 |
| 3,719,608 A | 3/1973 | Olstowski | 252/506 |
| 3,807,961 A | 4/1974 | Markel | 23/277 R |
| 4,102,960 A | 7/1978 | Borkowski | 264/42 |
| 4,146,401 A | 3/1979 | Yamada et al. | 106/56 |
| 4,175,022 A | 11/1979 | Vadla et al. | 204/243 R |
| 4,216,266 A | 8/1980 | Hirschvogel et al. | 428/408 |
| 4,265,952 A | 5/1981 | Caines | 428/36 |
| 4,350,576 A | 9/1982 | Watanabe et al. | 204/101 |
| 4,826,181 A | 5/1989 | Howard | 277/112 |
| 4,895,713 A | 1/1990 | Greinke et al. | 423/448 |
| 5,186,919 A | 2/1993 | Bunnell | 423/448 |
| 5,282,975 A * | 2/1994 | Maryasin et al. | 210/691 |
| 5,482,798 A * | 1/1996 | Mototani et al. | 429/224 |
| 5,772,930 A * | 6/1998 | Hashimoto et al. | 264/15 |
| 5,919,588 A * | 7/1999 | Jose et al. | 429/224 |

FOREIGN PATENT DOCUMENTS

| | | | |
|---|---|---|---|
| EP | 0170411 | 6/1985 | |
| EP | 0435766 A2 | 7/1991 | ........... C01B/31/00 |
| EP | 0596801 A2 | 5/1994 | ........... C01B/31/00 |
| GB | 1379350 | 1/1975 | |
| GB | 2078435 | 1/1982 | |
| JP | 56109460 | 8/1981 | ............ H01M/4/62 |
| JP | 56118267 | 9/1981 | |

(List continued on next page.)

OTHER PUBLICATIONS

Herold, et al., "Exfoliation of Graphite Intercalation Compounds: Classification and Discussion of the Processes From New Experimental Data Relative to Graphite–Acid Compounds," *Materials Science Forum*, vols. 152–153, 1994 Trans Tech Publications, pp. 281–288.

Chuetsu Graphite Works Co., Ltd., "Products Guide," provided by mnaufacturer Apr., 1997.

*Primary Examiner*—Carol Chaney
(74) *Attorney, Agent, or Firm*—Russell H. Toye, Jr.

(57) ABSTRACT

An electrochemical cell having a cathode containing an expanded graphite as an electrically conductive carbon material. To provide enhanced service performance in the cell, the expanded graphite has a kerosene absorption in the range of 2.2 to 3.5 ml/g, an average particle size of 17 to 32 micrometers, a $d_{90}$ value of 40 to 85 micrometers, and an average surface area-to-mass ratio of at least 18 m$^2$/g. A method is also provided for determining an optimum expanded graphite including the steps of measuring physical characteristics of the expanded graphite determining the performance of a cell containing the expanded graphite in the positive electrode, and determining the optimum expanded graphite for use in the cell.

20 Claims, 9 Drawing Sheets

FOREIGN PATENT DOCUMENTS

| | | | | |
|---|---|---|---|---|
| JP | 56128578 | 10/1981 | ........... | H01M/4/62 |
| JP | 58129764 | 8/1983 | | |
| JP | 60065781 | 4/1985 | | |
| JP | 60118618 | 6/1985 | ........... | C01B/31/04 |
| JP | 63232266 | 9/1988 | | |
| JP | 8167413 A | 6/1996 | | |
| JP | 08167413 | 6/1996 | ............ | H01M/4/58 |
| JP | 09129239 | 5/1997 | | |
| JP | 10188993 | 7/1998 | | |
| JP | 10245491 | 9/1998 | ......... | C08L/101/00 |
| JP | 10284056 | 10/1998 | ............ | H01M/4/02 |
| WO | WO9308123 | 4/1993 | | |

* cited by examiner

PERFORMANCE ANALYSIS

| Expanded Graphite | Service# to 0.9V | Microtrac Particle Size (μm) $d_{10}$ | $d_{50}$ | $d_{90}$ | mv♦ | ma* | BET Surface Area | Kerosene Abs. | Pellet Resist.@ | %Water (110°C) | Scott Density | Real Density | Surface Area (calc.) | Bulk Volume | Tap Density |
|---|---|---|---|---|---|---|---|---|---|---|---|---|---|---|---|
| S1 | 97.1 | 4.96 | 19.61 | 43.18 | 27.51 | 13.35 | 26.7 | 2.74 | 1.78 | 0.16 | 0.04 | 2.30 | 0.450 | 0.031 | 0.11 |
| S2 | 90.6 | 4.26 | 16.51 | 48.27 | 29.88 | 12.20 | 18.1 | 2.06 | 1.19 | 0.12 | 0.06 | 2.28 | 0.492 | 0.043 | 0.14 |
| S3 | 86.9 | 3.66 | 15.36 | 43.35 | 25.70 | 10.85 | 19.9 | 1.94 | 1.35 | 0.13 | 0.05 | 2.27 | 0.553 | 0.046 | 0.15 |
| S4 | 66.0 | 3.13 | 9.23 | 15.50 | 10.31 | 7.73 | 9.6 | 1.36 | 3.44 | 0.03 | 0.07 | 2.26 | 0.776 | 0.069 | 0.22 |
| S5 | 51.7 | 5.84 | 19.51 | 36.71 | 23.67 | 16.15 | 5.7 | 1.44 | 6.17 | 0.05 | 0.11 | 2.25 | 0.372 | 1.105 | 0.28 |
| S6 | 65.2 | 3.37 | 10.42 | 16.36 | 11.59 | 8.93 | 8.2 | 1.37 | 4.16 | 0.05 | 0.07 | 2.27 | 0.672 | 0.068 | |
| S7 | 77.0 | 20.69 | 81.60 | 160.21 | 110.02 | 45.80 | 21.3 | 4.39 | 1.61 | | 0.06 | 2.25 | 0.139 | 0.034 | 0.10 |
| S8 | 93.0 | 6.53 | 21.33 | 58.07 | 31.74 | 14.90 | 23.1 | 3.51 | 0.84 | | 0.04 | 2.30 | 0.403 | 0.034 | 0.11 |
| S9 | 90.0 | 4.72 | 20.42 | 16.62 | 44.25 | 13.60 | 21.5 | 2.78 | 1.08 | 0.06 | 0.05 | 2.27 | 0.441 | 0.042 | 0.12 |
| S10 | 72.3 | 4.72 | 9.93 | 18.18 | 11.05 | 8.22 | 8.4 | 1.25 | 4.37 | 0.10 | 0.08 | 2.25 | 0.730 | | 0.23 |
| S11 | 71.9 | 9.74 | 19.89 | 41.93 | 24.11 | 16.86 | 4.5 | 1.35 | 7.99 | 0.10 | 0.11 | 2.25 | 0.356 | | 0.28 |
| S12 | 82.7 | 10.91 | 35.06 | 118.67 | 54.92 | 23.26 | 13.7 | 2.60 | 1.47 | 0.09 | 0.10 | 2.24 | 0.258 | 0.057 | |
| S13 | 93.1 | 7.48 | 23.65 | 73.09 | 35.2 | 15.93 | 22.4 | 2.77 | 0.76 | 0.08 | 0.10 | 2.25 | 0.377 | 0.035 | 0.11 |
| S14 | 77.0 | 8.99 | 29.64 | 82.39 | 40.8 | 19.17 | 18.4 | 3.52 | 1.33 | 0.08 | 0.05 | 2.28 | 0.313 | 0.039 | 0.12 |
| S15 | 86.0 | 8.98 | 28.80 | 77.24 | 37.95 | 18.89 | 20.0 | 3.47 | 1.14 | 0.01 | 0.05 | 2.27 | 0.318 | 0.038 | |
| S16 | 85.0 | 9.04 | 29.96 | 85.26 | 41.76 | 19.33 | 18.4 | 3.20 | 1.35 | | 0.05 | 2.27 | 0.310 | 0.039 | |
| S17 | 76.0 | 8.99 | 34.48 | 94.09 | 46.43 | 22.23 | 18.3 | 4.38 | 1.56 | 0.11 | 0.06 | 2.29 | 0.270 | | 0.11 |

\# with 20:1 O:C ratio, 100 mA/g EMD   ♦mv=mean diameter of volume   *ma=mean diameter of area   @ with 20:1 O:C ratio, fully relaxed

ALKALINE CELL HAVING A CATHODE INCORPORATING ENHANCED GRAPHITE

CROSS-REFERENCE TO RELATED APPLICATION

This application claims the benefit of U.S. Provisional Application No. 60/072,269, filed Jan. 7, 1998, the disclosure of which is incorporated herein.

BACKGROUND OF THE INVENTION

The present invention generally relates to electrochemical cells having conductive cathode additives and, more particularly, to alkaline electrochemical cells having cathodes formed of a mixture of manganese dioxide and a conductive carbon material for forming a conductive matrix.

Typical alkaline electrochemical cells generally include a steel cylindrical can having a cathode containing manganese dioxide as the active material and formed on the interior surface of the steel can, an anode having zinc powder and binding agent dispensed in the central portion of the cell, a separator located between the anode and the cathode, and an alkaline electrolyte contacting the anode, cathode, and separator. A conductive anode current collector is generally inserted in the anode active material, and a cover and seal assembly closes the open end of the steel can.

In conventional alkaline cells, the cathode is generally configured as the positive electrode, while the anode is configured as the negative electrode. The cathode typically comprises a mixture of electrolytic manganese dioxide particles as the cathode active material, graphite as the electroconductive material, potassium hydroxide solution, and deionized water. The conductive graphite is added to enhance the electrical conductivity between the manganese dioxide particles as well as to enhance electrical conductivity between the steel can and the cathode active material, since the manganese dioxide has an extremely low specific conductivity. As a consequence, the conductive graphite provides an electroconductive matrix amongst the active manganese dioxide particles as well as with the steel can.

A primary goal in designing alkaline cells is to increase the service performance of the cell. The service performance is the length of time for the cell to discharge under a given load to a specific voltage at which the cell is no longer useful for its intended purpose. One approach taken to increase service performance has been to increase the internal volume of the cell in order to increase the amount of active materials that may be employed within the cell. However, the commercial external size of the cell is generally fixed, thereby limiting the ability to increase the amount of active materials within a particular size cell.

Within the cell, a higher content of graphite mixed with cathode active material may enhance the electrically conductive properties of the cathode. However, a larger amount of graphite also consumes a larger volume, which, in turn, causes a reduction in the amount of the manganese dioxide active material that can be used in the cathode. This can lead to a reduction in the discharge capacity of the battery. Contrarily, a decrease in the amount of graphite may allow for an increase in the amount of active manganese dioxide that can be used, but this may lead to an increase in the internal resistance of the cathode which may decrease the cell's discharge performance. Accordingly, it is desired to achieve a suitable compromise between the proportion of conductive material and manganese dioxide active material contained within the cathode of the cell.

Various attempts have been made for improving the discharge characteristics of electrochemical cells, particularly at high discharge rates. Since the conductivity of manganese dioxide is relatively low, the conductivity is ordinarily conferred on it by mixing in auxiliary conductive agents, such as graphite and/or acetylene black. However, the graphite and acetylene black, which are commonly used as the conductive agents, have intrinsic drawbacks, which include large volume consumption and high absorption characteristics.

In addition, conventional conductive additives employed in the cathode of the cell have included high levels of impurities which leads to an increase in gassing. Excessive gassing of hydrogen is known to decrease the performance of the cell. Accordingly, it is desirable to minimize the amount of gassing in the cell. Despite past increases in service performance with such additives, the need to find new ways to increase service performance remains the primary goal of the cell designers.

SUMMARY OF THE INVENTION

The present invention improves the service performance of alkaline electrochemical cells by the addition of an enhanced conductive graphite material to the cell's cathode. To achieve this and other advantages, and in accordance with the purpose of the invention, as embodied and described herein, the cathode of the electrochemical cell according to one aspect of the present invention includes an active cathode material, such as electrolytic manganese dioxide, combined with an electrically conductive carbon, comprising expanded graphite particles, for providing a conductive matrix which occupies low volume. The expanded graphite particles preferably have a kerosene absorption in the range of 2.2 to 3.5 ml/g. The cathode of the present invention is particularly adapted for use in electrochemical cells having an alkaline electrolyte.

In accordance with another aspect of the present invention, the expanded graphite particles have a purity level of greater than 99.9%.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 4 is a table illustrating the performance analysis of various samples of tested expanded graphite and measured characteristics thereof;

DETAILED DESCRIPTION OF THE PREFERRED EMBODIMENTS

Figure 1:
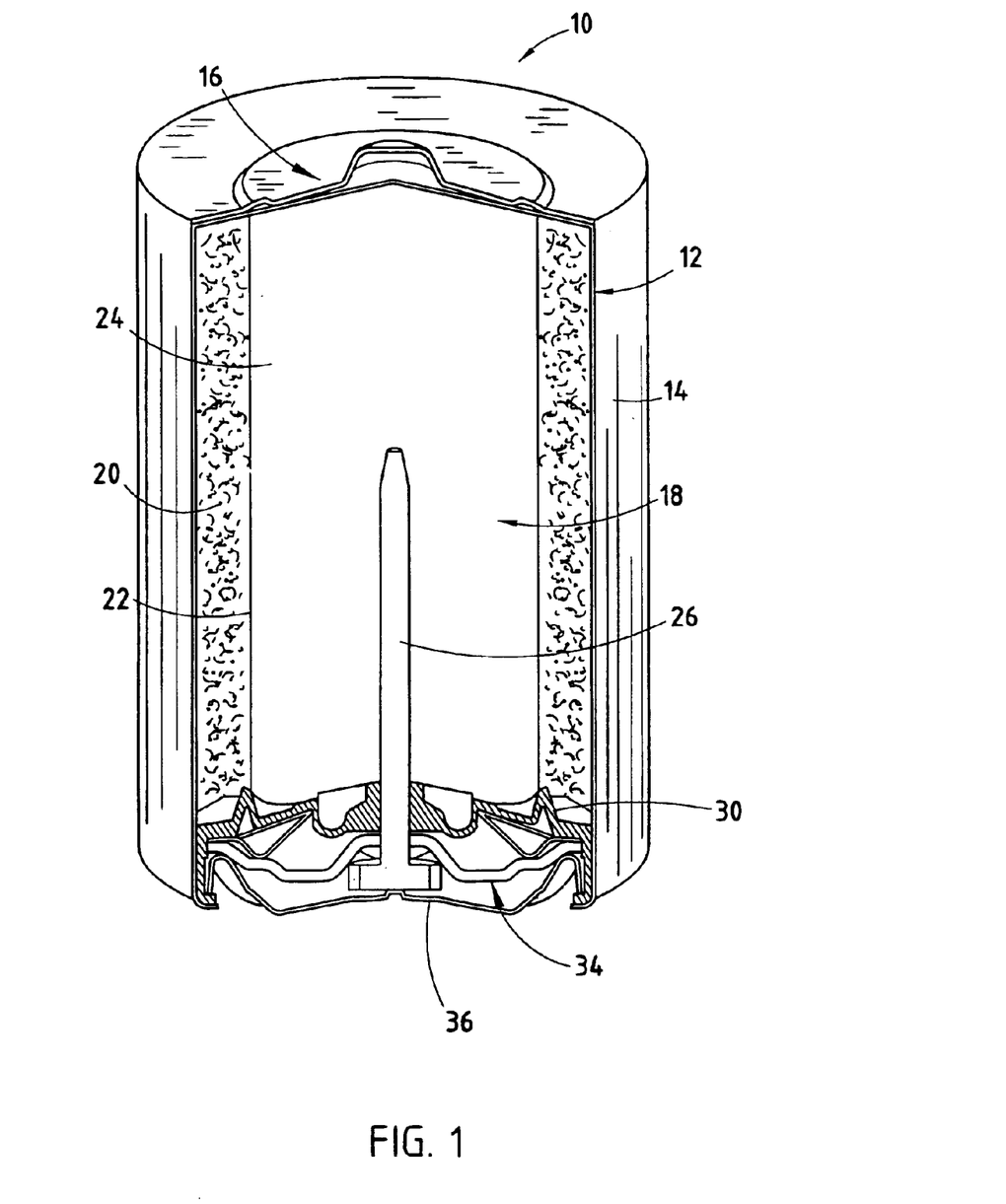
FIG. 1 is a cut-away perspective view of one example of an alkaline electrochemical cell constructed in accordance with the present invention.

Referring now to FIG. 1, a cut-away view of a cylindrical alkaline electrochemical cell 10 is shown therein. Alkaline cell 10 includes a steel can 12 having a cylindrical shape and one open end. A metallized, plastic film label 14 is formed about the exterior surface of steel can 12 except for the ends of steel can 12. At the closed end of steel can 12 is a positive cover 16 preferably formed of plated steel. Film label 14 is formed over the peripheral edge of positive cover 16.

A cathode 20 is preferably formed of a mixture of manganese dioxide, graphite, 45% potassium hydroxide (KOH) solution, deionized water. Additionally, an optional binder may be added to the cathode 20 mixture. A conductive can coating is formed about the interior side surface of the steel can 12. A separator 22, which is preferably formed of a non-woven fabric that prevents migration of any solid particles in the cell and provides electrical insulation, is disposed about the interior surface of cathode 20. An electrolyte 24 formed of potassium hydroxide is disposed within the interior of the separator 22. An anode 18, preferably formed of zinc powder, a gelling agent, and other additives, is disposed within the electrolyte 24 in contact with a current collector 26, which may be formed of brass. Accordingly, the cathode 20 is configured as the cell's positive electrode, and the anode 18 is configured as the cell's negative electrode.

Current collector 26 contacts the negative cover 36. A nylon seal 30 is formed at the open end of steel can 12 to prevent leakage of the active ingredients contained in the steel can 12. A negative cover 36, which is preferably formed of plated steel, is disposed in contact with the current collector 26. The negative cover 36 is electrically insulated from the steel can 12 by the nylon seal 30.

The cathode 20 of the present invention contains an active cathode material, such as electrolytic manganese dioxide (EMD). In addition, the cathode 20 of the present invention further contains a conductive carbon material, referred to herein as expanded graphite, to provide a conductive matrix within the cathode 20, between the manganese dioxide particles as well as between the manganese dioxide and the steel can, to provide for enhanced service performance of the electrochemical cell 10.

Expanded Graphite Additive

The cathode 20 of the present invention preferably employs electrolytic manganese dioxide (EMD) particles as the active cathode material. Electrolytic manganese dioxide has a relatively low specific conductivity, and therefore a conductive material is typically added with the electrolytic manganese dioxide particles to the cathode 20. According to the present invention, a conductive material is added to the electrolytic manganese dioxide in an amount that allows for lower cathode resistance, therefore enhancing the electrical conductivity within the cathode 20 and allowing for a greater amount of manganese dioxide, thereby increasing the service performance of the cell.

According to the present invention, expanded graphite particles are added to the cathode 20 as the conductive material. The expanded graphite can be defined as a graphite in which the crystal lattice has been expanded. There are many known methods for expanding graphite including the incorporation of acid/oxidant followed by thermal treatment. Expanded graphite can be added as the electrically conductive material in an amount that is less than the amount of conventional graphite that is normally required, and yet provides adequate conductivity and cathode moldability to realize increased overall cell performance, especially under high discharge rate applications of the cell. The use of expanded graphite in the alkaline cell cathode 20 provides a much lower overall bulk cathode resistivity as compared to conventional carbon which includes a crystalline graphite. The expanded graphite further allows for the use of a greater amount of electrolytic manganese dioxide within the generally predefined volume of the cathode 20 of the alkaline cell 10.

Figure 2:
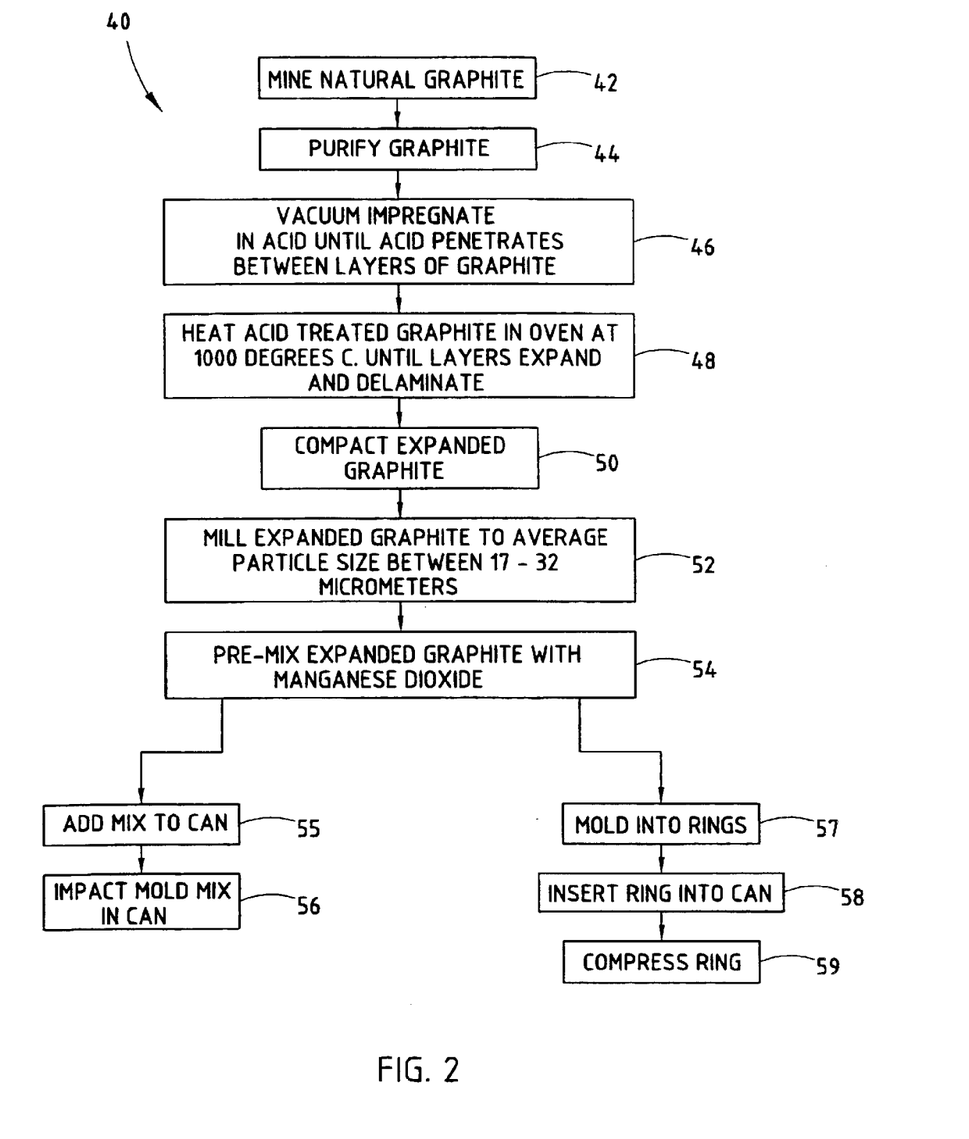
FIG. 2 is a flow diagram illustrating a method of producing expanded graphite for use in a cathode of an electrochemical cell.

Referring to FIG. 2, a method 40 of manufacturing and using expanded graphite in the cathode 20 of cell 10 is shown. The expanded graphite additive, according to one embodiment, preferably includes a natural graphite that is first chemically treated and then heated so that it expands in size as described by the following process. A natural graphite, which is typically mined from the earth pursuant to step 42, is purified to a high purity level in step 44. The purification process may include a thermal treatment process as disclosed in U.S. Pat. No. 3,807,961 (Markel), or by other techniques, such as successive flotations and chemical treatment. In step 46, the high purity graphite is preferably soaked in sulfuric acid and nitric acid until each of its graphite layers have been acid soaked therein. Alternately, hydrogen peroxide and chromic acid could be used to acid treat the graphite.

Once the graphite layers are acid soaked by vacuum impregnation, the graphite is ready for heat treatment as provided in step 48. The degree of expansion of the graphite layers can be controlled by careful time and temperature control. The heating process preferably involves quickly plunging the acid-treated graphite material into a furnace at approximately 1000° C. for an approximate time period of two to ten minutes, until the graphite expands in size and delaminates. An oven temperature in the range of 850° C. to 1100° C. may be suitable for the heat treatment. This heat treatment process expands the graphite approximately three hundred times its original thickness and provides a wrinkled, wavy surface. The resulting expanded graphite layers are typically much thinner than the conventional, non-expanded crystalline graphite layers.

Following the heating process in methodology 40, the expanded graphite is compacted as provided in step 50. The compacted expanded graphite may also be washed and dried at this point. Next, the compacted expanded graphite undergoes a milling process using a jet mill. It is preferred that the milled expanded graphite have an average particle size in the range of seventeen to thirty-two micrometers (17–32 $\mu$m) as provided in step 52. For purposes of this application, average particle size is referred to as the $d_{50}$ mean average particle size, which can be measured with a Microtrac full range analyzer. The particle size below which 90% of the total distribution lies is referred to as the $d_{90}$ value, and the particle size below which 10% of the total distribution lies is referred to as the $d_{10}$ value. When the milling process is complete, the expanded graphite may then be premixed with manganese dioxide and other additives to form the cathode 20 of cell 10 as provided in step 54. The cathode mix is preferably disposed in the steel can of cell 10, and cell 10 is preferably assembled according to known impact or ring molding techniques.

According to the cathode impact molding cell assembly technique, method 40 proceeds to step 55 in which the cathode mix is added to the can. The cathode mix is then impact molded via step 56 in accordance with known impact molding techniques. This generally includes packing the cathode mix with the use of a cylindrical ram rod that is forcibly actuated through the longitudinal axis of the can. This may include either adding the entire mix and subsequently impacting the cathode mix with the ram rod, or sequentially adding some mix and thereafter packing with the ram rod. In any event, the ram rod forms an anode cavity centrally located within the cathode mix.

According to a cathode ring molding technique, method 40 proceeds to step 57 in which the cathode mix is molded into rings. The process of forming ring molded cathodes generally includes adding a measured charge of cathode mix to a ring-shaped die set and, with the use of a die press, molding the cathode mix into the shape of a ring. The process of forming and inserting molded cathode rings into a cell can is widely known in the art. Next, according to step 58, one or more ring molded cathode rings are inserted into the steel can. This may be accomplished by loading a fixed number of one or more cathode rings onto a mandril, which is then lowered into the can and the cathode rings are pressed into the can by way of an upper punch. The number of cathode rings inserted into a particular cell may vary depending on the size of the cell. For example, for AAA- and AAAA-type alkaline cells, three or four cathode molded rings may be adequate to form the cathode of each cell. Once inserted, the cathode rings are compressed together in step 59 so that the rings are compactly fit, stacked one on top of the other, and located about the inner wall of the can.

According to one example, the process of producing an expanded, highly lamellar graphite product for use in the present invention is described in more detail as follows. The process requires: the provision of a suitable starting material of lamellar graphite; the intercalation of the starting material with a graphite intercalation compound (GIC); the expansion of the GIC to obtain thermally expanded graphite; and air (or jet) milling the thermally expanded graphite to obtain a delaminated, exfoliated graphite product having a high degree of uniformity in particle size, a high bulk volume, and a high surface area to mass ratio.

The starting material is preferably natural mineral flake graphite or synthetic graphite having a degree of three-dimensional ordering, i.e., highly oriented pyrolytic graphite ("HOPG"). The degree of three-dimensional ordering of the graphite can be quantified by X-ray diffraction ("XRD"). The XRD parameter generally used is referred to as $L_a$ and, based on XRD analysis, the graphite best suited for the inventive process has $L_a$ values in excess of 2,000 Å and preferably higher.

In the preferred method, the starting material is natural flake graphite, mined in Mozambique and processed to a minimum level of purity of 99.9 weight percent LOI (loss on ignition) and a particle size between about −20 mesh and +60 mesh, preferably between about 30 mesh and 70 mesh (200–600 microns). Such a natural flake graphite can be obtained from the Superior Graphite Co. of Chicago, Ill., as 2901 grade graphite.

The purified starting material is then intercalated with a GIC that will insert between the lamellae of the graphite structure. There are many different methods by which this can be accomplished. Typically, the graphite particles are treated with a strong oxidizing acid, such as highly concentrated combinations of sulfuric and nitric acids. If sulfuric acid is used as an intercalant acid, the sulfur content of the acid treated graphite should be at least 2.0% by weight, and preferably as high as 3.0%. The preferred intercalated graphite is acid-treated chemical flake graphite from UCAR Carbon Company of Danbury, Conn., which is natural graphite intercalated with sulfuric acid and nitric acids. The volatile content of the preferred flake graphite after intercalation is preferably between about 12% to 22% by weight.

Next, the intercalated graphite is treated, forcing the lamellae of the individual particles to separate and, thus, expand the graphite to an accordion-like configuration. If the graphite is acid intercalated, the expansion is accomplished by rapidly heating the intercalated graphite to temperatures of about 850° C. to 1,000° C. Such heating may be done in any number of ways, such as by directly heating the intercalated graphite with a flame, by placing the intercalated graphite on a hot surface, by using infra-red heating elements, by inductive heating, or the like. The intercalated graphite is thermally expanded to produce a product that is typically expanded to greater than 125 times its initial volume, with a bulk volume of approximately 250 ml/g or more and with a surface area-to-mass ratio of 35 $m^2/g$ or greater.

After the graphite has been suitably intercalated and exfoliated, the graphite is subjected to air milling, which further delaminates and separates the expanded graphite. This yields a fine graphite that exhibits a substantially higher specific surface area than the same material milled to the same particle size, but not intercalated and expanded. The expanded graphite is milled in a fluid energy-type attrition mill, or air mill. In the preferred process, a flat-configured or "pancake-type" air mill is used to produce a product that may have a mean particle size of approximately 30 microns and a surface area-to-mass of greater than 18 $m^2/g$.

The expansion or exfoliation and milling steps for producing expanded graphite may include the following. The intercalated graphite flakes (preferably the flake graphite identified above) are dumped into a flake feeder, from which the graphite flakes are fed continuously into the flame of a gas-fire calciner/furnace to heat the intercalated flake to at least approximately 870° C. (1,600° F.) in less than one minute. In practice, the intercalated graphite flakes are fed into the calciner at a rate of approximately 150 lb/hr.

In the calciner, the intercalated graphite flake is preferably expanded to form thermally expanded graphite flakes or worms having a bulk volume of at least 250 ml/g and a surface area-to-mass ratio of approximately 35 $m^2/g$. The thermally expanded graphite worms exit the calciner and enter a cyclone which separates the thermally expanded graphite flake from the entraining burner gases. The thermally expanded graphite flakes drop out of the bottom of the cyclone into a second flake feeder, while the exhaust gases from the calciner exit the top of the cyclone to a scrubber.

From the flake feeder, thermally expanded graphite flakes are fed to an air mill. The air mill includes a positive feed induction system, a grinding and classifying ("reduction") chamber, and a single discharge. The thermally expanded graphite flakes entering the reduction chamber are entrained by a stream of circulating fluid (air), and jet action breaks up the thermally expanded graphite particles by inter-particle collisions. The centrifugal force shifts the larger, heavier thermally expanded graphite flakes toward the outer periphery of the reduction chamber, causing them to be re-introduced into the jet stream for further grinding. The finer particles migrate towards the outlet of the mill.

In practice, the air mill is an Aljet 24 inch flat-configured attrition mill, which processes the thermally expanded graphite flakes at a rate of approximately 120 lb/hr to produce thermally expanded graphite flakes having a bulk volume of approximately 0.050 g/cc (or 200 ml/g), a surface area-to-mass ratio of at least about 18–22 m$^2$/g, and a mean particle size of approximately 30 microns. These characteristics can be varied by adjusting the rate at which the thermally expanded graphite flakes are milled. Over-feeding the mill results in coarser thermally expanded graphite flakes, while underfeeding results in finer thermally expanded graphite flakes.

The air milled thermally expanded graphite flakes pass through a second cyclone, which separates out the milled thermally expanded graphite flakes of the desired mass and deposits them into a finished product bin. The undersized thermally expanded graphite flakes or "fines" are exhausted from the cyclone into bag house, from which the fines are deposited into a "waste" bin. The desired expanded graphite particles are then employed in the cathode of cells according to the present invention.

Figure 3:
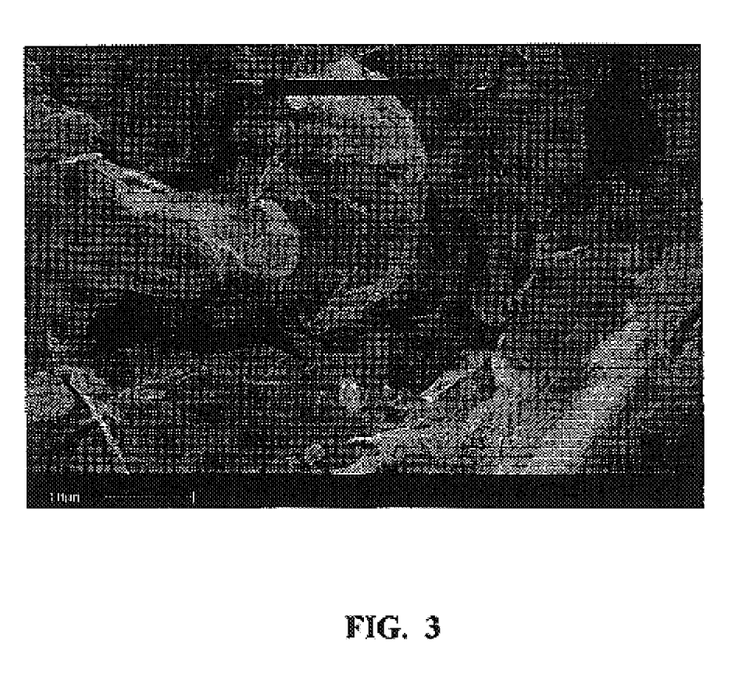
FIG. 3 is an enlarged photographic view of expanded graphite additive for use in a cathode of the electrochemical cell.

One of the main features of the expanded graphite of the present invention is its particle shape, which allows for achievement of a low-weight percent carbon containing alkaline cell cathode. Referring to FIG. 3, the photograph taken with a scanning electron microscope (SEM), magnified at a power of 5000 times, illustrates expanded graphite manufactured according to the aforementioned process. The expanded graphite crystals have a cupped or baseball-glove shaped configuration. This is contrary to conventional crystalline graphite, which typically has a flatter, laminar surface. It is believed that the cupped-shaped configuration allows the expanded graphite particles to have more contact points with the electrolytic manganese dioxide particles than conventional flat graphite, and thus expanded graphite particles provide a lower, overall contact resistance. Whereas, a flat crystalline graphite would, theoretically, have only one contact point on its surface with an electrolytic manganese dioxide particle. The multiple contact points provided with the expanded graphite particles allow enhanced electrical contact, and therefore allow for a reduction in the amount of graphite that is required in the cathode 20 of cell 10. The multiple contact points which are realized with the expanded graphite particles allow a greater number of conductive paths between manganese dioxide particles so that alternative electrically conductive paths are made available. This can be especially advantageous should oxidation or electric discontinuity develop in one or more current paths. In addition, the expanded graphite particles may provide enhanced electrolyte retention.

Once formed and milled, the expanded graphite particles can be mixed with the electrolytic manganese dioxide to form the cathode 20 as follows. The expanded graphite may be used to form cathode mixes with different conductivities based on the electrolytic manganese dioxide used, as one manganese dioxide may provide a better fit with a cup-shaped expanded graphite particles than others, particularly based on particle shape and size of the expanded graphite. Such parameters can be optimized as necessary. The electrolytic manganese dioxide and cup-shaped expanded graphite particles are mixed together in a mixer for a short time at a high intensity. The mixer may include an FS Series Model No. LFS-GS-2J manufactured and sold by the Fukae Powtec Corp. of Japan having a blender with a vertically oriented agitator blade that pushes the material to the sides of a specially shaped drum. On the side of the drum of the mixer is a small, high-speed chopper blade that performs the actual mixing. The design of the drum affords even blending of all portions of the added powder. It is recommended that the electrolytic manganese dioxide and expanded graphite particles be mixed for a period of three to seven minutes at a speed of 250–1000 RPM with an agitator blade and at a speed of 680–2500 RPM with a chopper blade. Extended mixing may result in finely ground expanded graphite particles and increased electrical resistivity.

According to the aforementioned mixing technique, a specific sequence is preferably followed. The heaviest material, particularly the electrolytic manganese dioxide, is first added to the mixer, followed by the lighter materials, such as the expanded graphite particles. When properly mixed, the electrolytic manganese dioxide and expanded graphite materials should not be separated during subsequent handling.

According to one embodiment, the cell's bulk cathode preferably contains an amount of expanded graphite in the range of 3.2% to 6.25% by weight of the total cathode, and more particularly contains expanded graphite of approximately 5% by weight of the total cathode. This is in contrast to conventional cells which commonly require conventional synthetic graphite in an amount of 8% to 10.5% by weight of the total cathode for the same cathode size and configuration. Accordingly, the use of expanded graphite consumes less volume and weight than conventional graphite currently used in alkaline cells. As a consequence of using a conductive material of less volume, additional volume remains available in the cathode to employ added electrolytic manganese dioxide or other active cathode materials, thereby leading to enhanced service performance of the cell, particularly for high-rate service applications.

With particular reference to FIG. 4, measured results for flooded half-cell testing for various expanded graphite materials are shown. The half-cell configuration involves the testing of a 0.5 gram cathode pellet in a flooded electrolyte condition. A 100 mA/g electrolytic manganese dioxide discharge corresponds to approximately 1000 mA constant current discharge for a current standard size AA electrochemical cell. A 20:1 weight ratio of electrolytic manganese dioxide:carbon in the cathode mixture was used which corresponds to 4.8% by weight of carbon in the mix.

In all, the expanded graphite of the present invention exhibited a $d_{50}$ average particle size of approximately 23.6 microns when measured with the Microtrac full range analyzer. The Microtrac full range analyzer reading provides a $d_{50}$ average particle size, a $d_{90}$ value and a $d_{10}$ value. The Microtrac full range analyzer may include the Model No. 9200 Series manufactured and sold by Microtrac, Inc. The Microtrac full range analyzer also initially calculates the area and perimeter of the measured particles from which a volume can be calculated. The Microtrac full range analyzer further determines a mean average volume and mean average area of the measured particles. According to the present invention, it is preferred that a $d_{50}$ average particle size be in the range of 17 to 32 micrometers as measured with the Microtrac full range analyzer.

As shown in FIG. 4, a plurality of samples of expanded graphite, labeled samples S1 through S17, were analyzed as to performance and physical characteristics. For each sample of expanded graphite, a service time was measured in minutes to reach a 0.9-volt cutoff, in accordance with a 100 mA/g electrolytic manganese dioxide discharge for the flooded half-cell test. Sample S1 achieved the highest service performance of 97.1 minutes. In addition to service performance, the average particle size ($d_{50}$), $d_{90}$ value and $d_{10}$ value (in μm), as measured with the Microtrac full range analyzer, are provided along with the calculated mean diameter of volume and mean diameter of area, as calculated by the Microtrac full range analyzer. Other performance measurements include BET surface area ($m^2/g$), kerosene absorption (ml/g), pellet resistance (ohms), water (weight percent), Scott density ($g/cm^3$), and real density ($g/cm^3$). Additional measurements include calculated surface area ($m^2/cm^3$), bulk volume ($g/cm^3$) and tap density ($g/cm^3$) measurements. Optimum service performance was achieved with sample S1 with a service performance time of 97.1 minutes for an expanded graphite having an average particle size of 19.61 micrometers. However, service performance may differ depending on the various characteristics of the expanded graphite, as well as the manganese dioxide and other characteristics of the cell.

Figure 5:
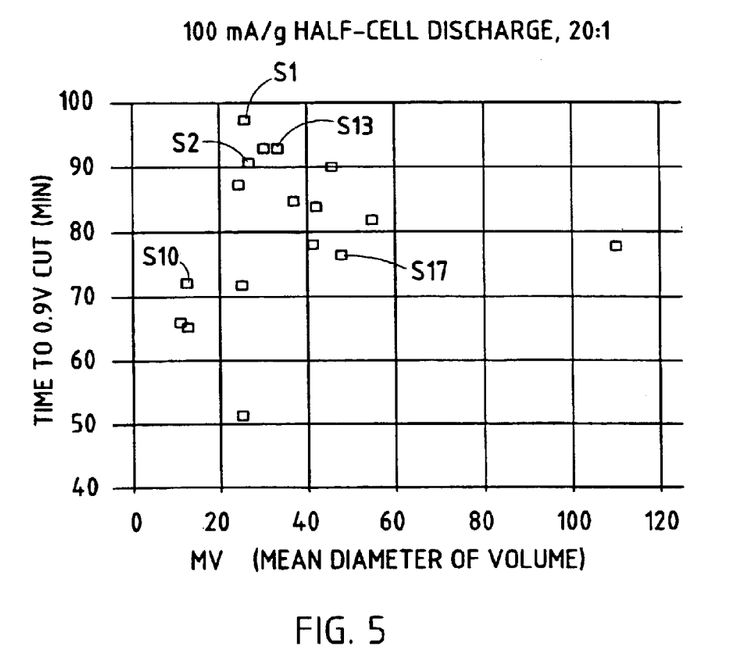
FIG. 5 is a graph illustrating the mean diameter of volume for the tested expanded graphite particles as provided in FIG. 4.
Figure 6:
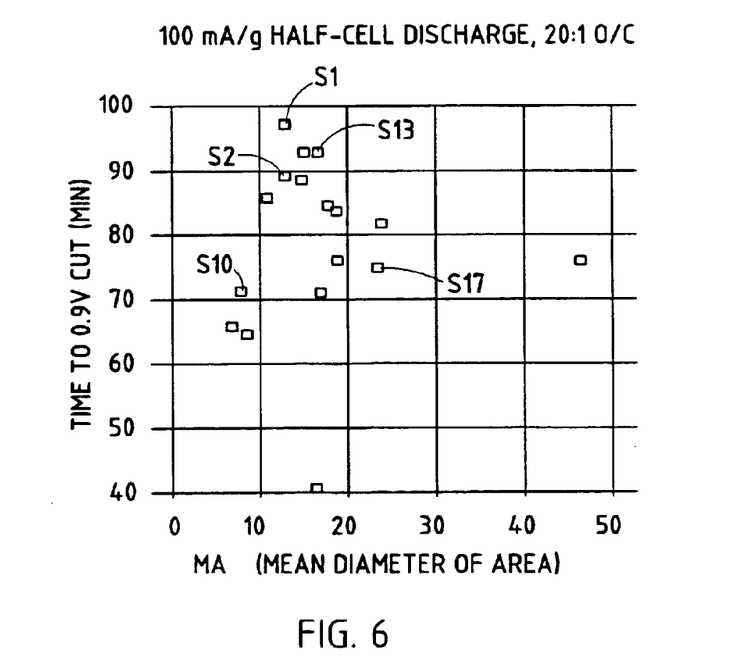
FIG. 6 is a graph illustrating the mean diameter of area for the tested expanded graphite particles as provided in FIG. 4.
Figure 7:
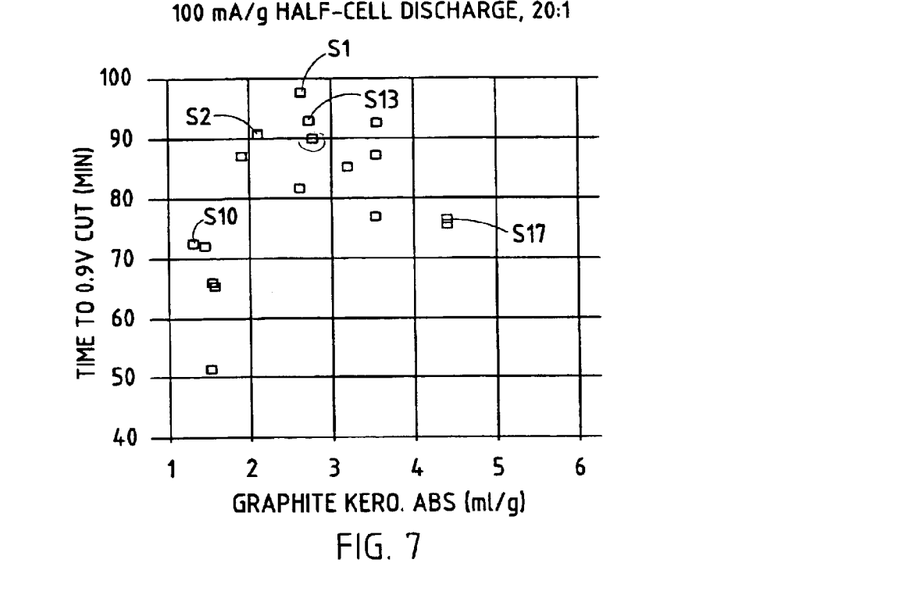
FIG. 7 is a graph illustrating the expanded graphite's kerosene absorption for the tested expanded graphite samples as provided in FIG. 4.
Figure 8:
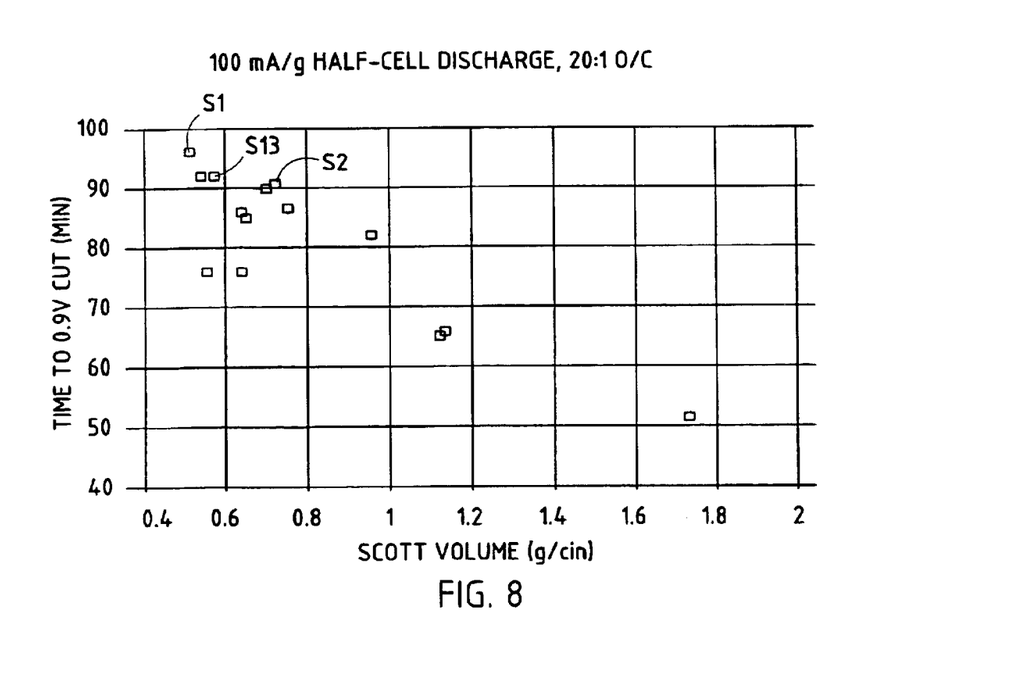
FIG. 8 is a graph illustrating the Scott volume of the tested expanded graphite samples as provided in FIG. 4.
Figure 9:
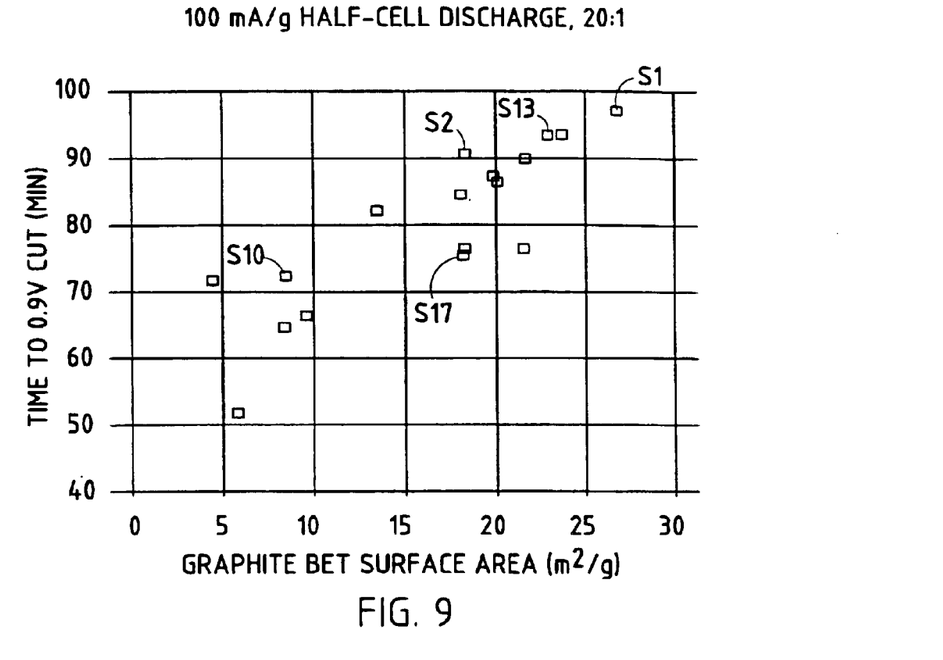
FIG. 9 is a graph illustrating the expanded graphite's BET surface area for the tested expanded graphite samples as provided in FIG. 4.
Figure 10:
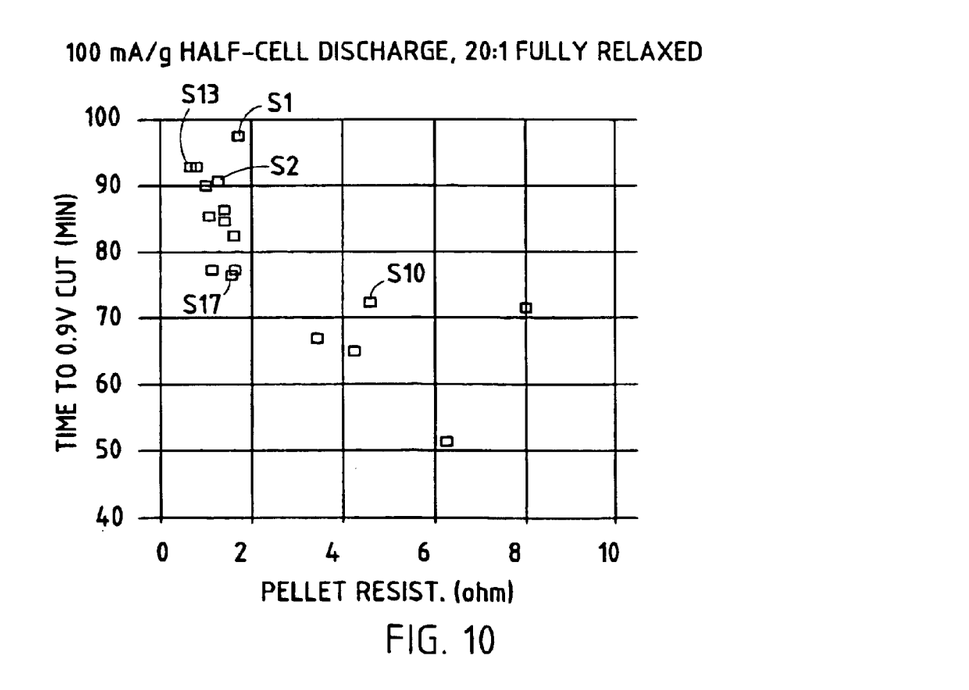
FIG. 10 is a graph illustrating pellet resistance for the tested expanded graphite samples as provided in FIG. 4.

Referring to FIGS. 5–10, selected measured test data, which are shown in the table of FIG. 4, are plotted in graphs and may be used to determine an optimum expanded graphite for use in a cathode of a cell. In particular, FIG. 5 illustrates the mean diameter of volume versus service performance time in minutes for each of the samples S1–S17 of expanded graphite, as measured with the Microtrac full range analyzer. FIG. 6 illustrates the mean diameter of area, as measured with the Microtrac full range analyzer along with the service performance time in minutes. FIG. 7 illustrates the kerosene absorption of the expanded graphite in milliliters per gram (ml/g) versus the service performance time. FIG. 8 illustrates a measurement of the Scott volume in grams per cubic inch (g/cin) versus the service performance time. FIG. 9 illustrates the expanded graphite BET surface area in meters squared per gram ($m^2/g$) versus the service performance time, while FIG. 10 illustrates the cathode pellet resistance in ohms versus the service performance time. From each of the graphs provided in FIGS. 5–10, determinations can be made as to the optimum expanded graphite that may be used for a given cathode in a cell to achieve optimum service performance for an intended application.

The physical characteristics of the expanding graphite particles can be measured with the Microtrac full range analyzer or other comparable particle analyzers. Physical characteristics of expanded graphite particles that can be measured with such a particle analyzer include the mean diameter of volume, mean diameter of area and a calculated surface area ($m^2/cm^3$).

The kerosene absorption is an indication of the ability of the expanded graphite to absorb electrolyte relative to kerosene. The expanded graphite of the present invention has a preferred kerosene absorption in the range of 2.2 to 3.5 milliliters per gram (ml/g), more preferably 2.2 to 3.3 milliliters per gram (ml/g), and most preferably in the range of 2.7 to 3.1 milliliters per gram (ml/g). Kerosene absorption measurements can be performed by wetting a fixed amount of expanded graphite with kerosene/surfactant solution, made up of 96% kerosene and 4% dimethyl di (cocoalkyl) quaternary ammonium chlorides (one example of which is commercially available as ARQUAD 2C-75 from Akzo Nobel Chemicals, Inc.). With continuous agitation, the kerosene is added at a fixed rate until expanded graphite agglomerates join and become a single ball, at which time an absorption value is determined by the number of milliliters of test solution added to the sample.

For purposes of the claims, the kerosene absorption test procedure includes adding 10 to 25 gram, plus or minus 0.1 grams, of a sample of expanded graphite to a clean, dry 500 milliliter Erlenmeyer flask, and inserting the flask in a holder of a shaking machine. The tip of a buret is adjusted to a preferred height about one inch above the mouth of the flask. The shaker may include a Burrell wrist action shaker Model No. BB, made available by Burrell Scientific, or equivalent, with the amplitude lever set to position "5" to produce a mild agitation of a sample in the flask. A stopcock on the buret is opened and the kerosene solution is dispensed at the rate of three to four drops per second, which corresponds to approximately nine to twelve milliliters per second. As the solution is added and the mixture becomes agitated, a point will be reached where the powdered material forms small agglomerates. At this point, the amplitude of the lever of the shaker is preferably raised to position "10," and also the solution being added should be reduced to one drop per second, to avoid passing the end point. As the solution is added and the shaking continues, small balls combine with one another to produce larger balls and, as the end point approaches, a desired single ball is realized. When a single ball that does not break down with continued shaking is formed, the buret reading is recorded and the absorption value is equal to the number of milliliters of test solution added to the sample.

In addition, other measured test data may include a tap density value of the expanded graphite. The tap density testing procedure includes subjecting a fixed sample weight of expanded graphite to a predetermined number of taps, such as 1,000 taps, at a first frequency over a period of time, such as four minutes, in a graduated cylinder to achieve packing, e.g., filling in of voids, in a consistent and repeatable manner. The procedure includes weighing the predetermined amount of expanded graphite in a graduated cylinder using a powder funnel. The cylinder may be placed in a dual auto tap device such as Model No. DA1, made available from the Quantachrome Corporation. The dual auto tap device is set to provide uniform repeated taps to the cylinder for the predetermined period of time to provide a predetermined number of taps. The cylinder is then removed from the apparatus and the volume of the sample of expanded graphite is measured. In addition, the expanded graphite is weighed. The tap density value is a function of the measured weight in grams of expanded graphite divided by the measured volume following the tap density testing procedure. This tap density testing procedure provides for a tap density value in grams per cubic centimeters ($g/cm^3$).

Figure 12:
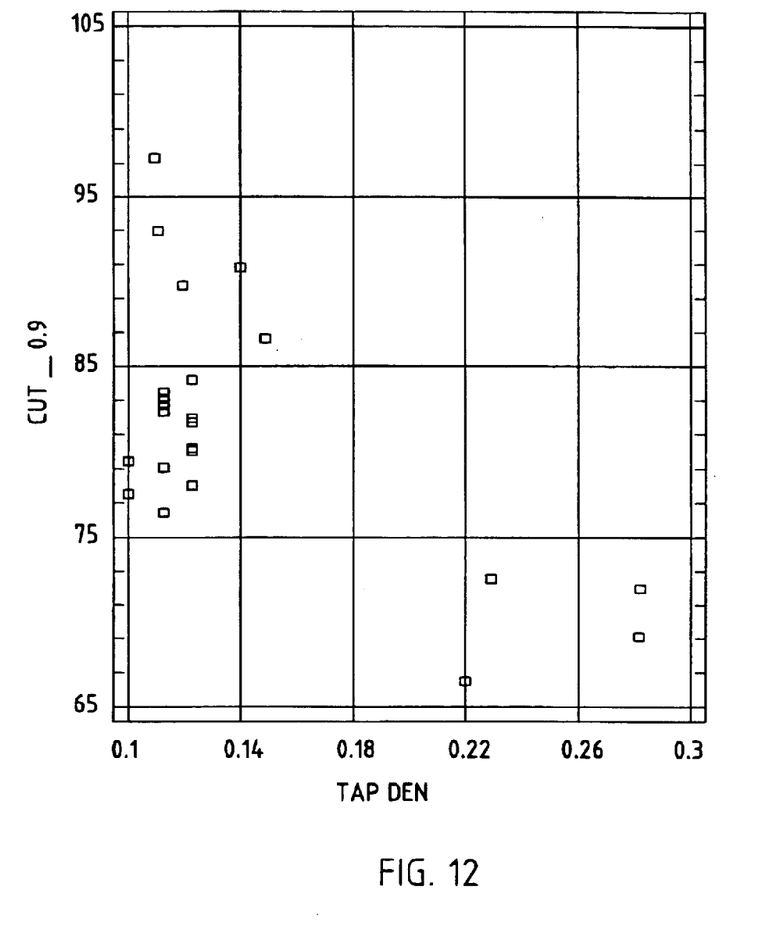
FIG. 12 is a graph illustrating tap density measured for samples of expanded graphite particles.

Referring particularly to FIG. 12, the graph provides an illustration of measured tap density values as determined in accordance with the aforementioned tap density testing procedure. The tap density is provided as a function of the service performance time and minutes for each of the samples of expanded graphite to reach a cutoff voltage of 0.9 volts. According to the present invention, it is preferred that the expanded graphite have a tap density value in the range of 0.09 to 0.14 g/cc.

The expanded graphite particles of the present invention are purified to a high purity level. The following table lists the maximum amount of impurities in parts-per-million (PPM) for each impurity that may be present in the expanded graphite particles:

| TOTAL IMPURITIES | MAXIMUM LIMITS (PPM) |
|---|---|
| a) Antimony (Sb)* | 2.0 |
| b) Arsenic (As)* | 1.0 |

-continued

| TOTAL IMPURITIES | MAXIMUM LIMITS (PPM) |
|---|---|
| c) Molybdenum (Mo)* | 2.0 |
| d) Vanadium (V)* | 10.0 |
| e) Chromium (Cr)* | 5.0 |
| f) Iron (Fe)* | 150.0 |
| g) Copper (Cu)* | 5.0 |
| h) Tin (Sn)* | 2.0 |
| i) Aluminum (Al) | 25.0 |
| j) Calcium (Ca) | 75.0 |
| k) Cobalt (Co) | 3.0 |
| l) Lead (Pb) | 5.0 |
| m) Nickel (Ni) | 5.0 |
| n) Silicon (Si) | 200.0 |

Accordingly, the expanded graphite realizes an aggregate total maximum limit of 490 ppm of impurities which amounts to 0.049% impurities or 99.951% pure expanded graphite. It is preferred that the expanded graphite particles have a purity of at least 99.95% or higher. The impurities deemed most critical are marked with an (*) and include antimony, arsenic, molybdenum, vanadium, chromium, iron, copper, and tin, which together have an aggregate total maximum allowed amount of 170 ppm of critical impurities or amounts to 0.017% critical impurities or 99.983% non-critical impurities.

It has been determined that the electrochemical cell of the present invention employs a positive electrode, referred to as the cathode, having manganese dioxide as the active material and expanded graphite particles as the electrically conductive carbon. The expanded graphite particles have preferred characteristics that achieve optimum service performance for the cell. To achieve optimum service performance, it is preferred that the expanded graphite particles have a kerosene absorption value in the range of 2.2 to 3.5 milliliters per gram. (ml/g), more preferably 2.7 to 3.1 milliliters per gram. Further, it is also preferred that the expanded graphite have both an average particle size in the range of 17 to 32 micrometers and a $d_{90}$ value in the range of 40 to 85 micrometers, and yet more preferred that the expanded graphite also have an average surface area-to-mass ratio of greater than or equal to 18 $m^2$/gram. The most preferred particle size distribution of the expanded graphite is defined by an average particle size of 17 to 32 micrometers, a $d_{10}$ value of 40 to 85 micrometers and a $d_{10}$ value of 3–9 micrometers. It is preferred that the tap density have a preferred value in the range of 0.09 to 0.14 g/cc. It is further preferred that the expanded graphite have a Scott density no greater than 0.07 grams/milliliter (g/ml), and preferably no greater than 0.05 g/ml.

According to a second embodiment, a non-acid treated delaminated graphite may be used in place of the acid-soaked, thermally treated expanded graphite described above. The non-acid treated delaminated graphite is processed in a thermal treatment process, but does not require the use of acid soaking. Instead, a natural graphite is placed in an oven and heat treated as explained above, but without the acid soaking treatment. The non-acid thermal treatment process causes the natural graphite to delaminate to form multiple thin graphite strips.

According to yet another embodiment, a chemically treated synthetic expanded graphite can be used. This chemically treated, synthetic expanded graphite can be used in cathode mix ratios with electrolytic manganese dioxide of 20:1 oxide-to-carbon weight ratio. According to flooded half-cell testing, the synthetic expanded graphite exhibits a high-rate performance at 50 mA/g manganese dioxide constant current. Cathode mixes containing this synthetic, chemically treated expanded graphite have also shown low cathode pellet resistivities with values in the range of cathode mixes containing a thermally prepared expanded graphite as explained above. Based on initial test results, it is expected that standard AA-size cells containing this specific synthetic expanded graphite in the cathode may exhibit high-rate service performance greater than current factory products, as this material is expected to provide increased cathodic service performance in both ring-molded and impact-molded cathode assemblies.

Method of Determining Optimal Expanded Graphite Additive

Figure 11:
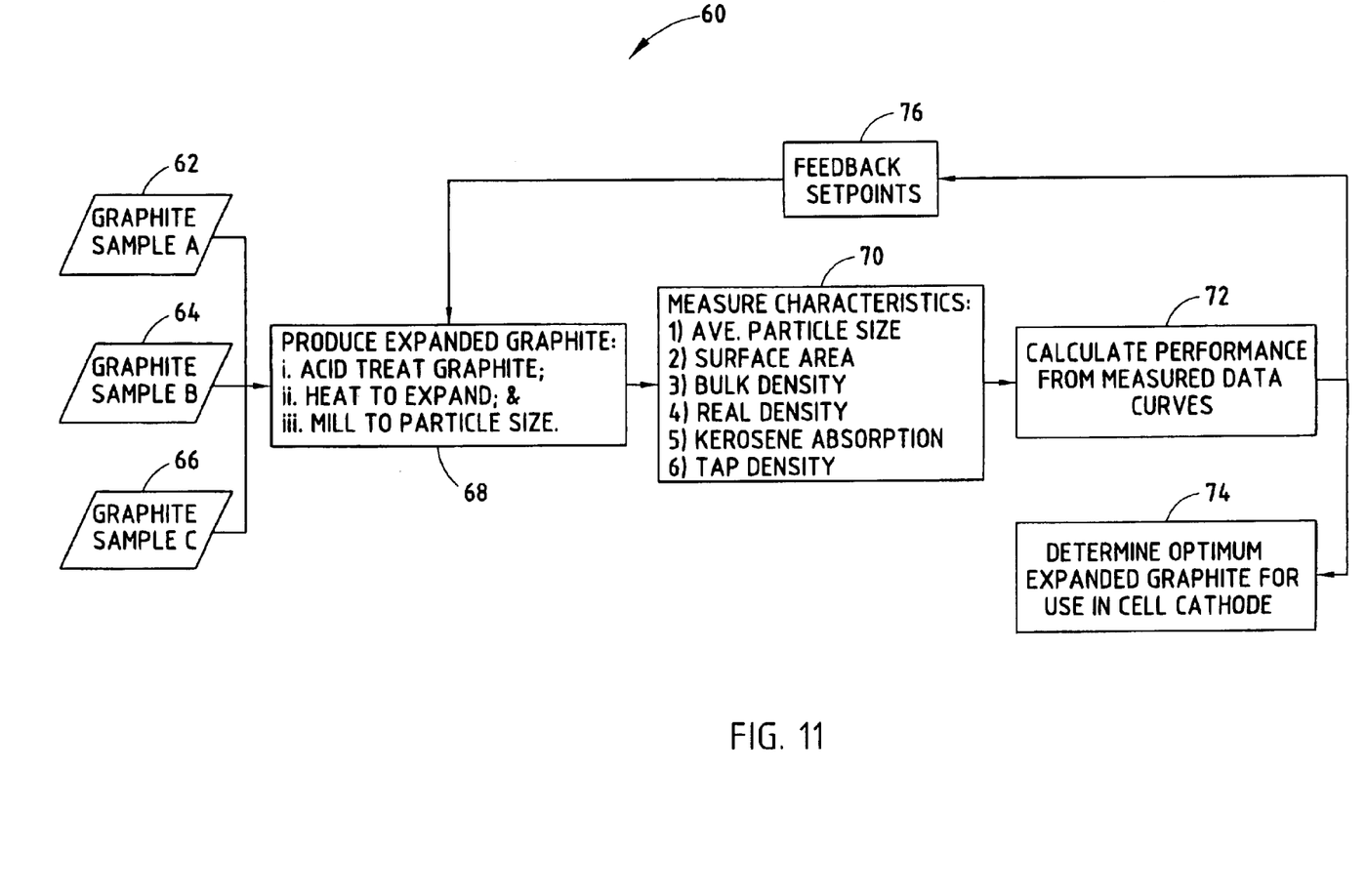
FIG. 11 is a block diagram illustrating the methodology for determining a preferred expanded graphite for use in a cathode of an electrochemical cell according to the present invention.

Referring to FIG. 11, a method 60 is provided for determining an optimum expanded graphite from numerous samples for use in the cathode 20 of the electrochemical cell 10. The method includes sampling one graphite at a time, from a plurality of graphite samples, such as graphite Sample A 62, Sample B 64, and Sample C 66, as shown. Each sample of graphite may include natural graphite obtained from a mine and purified in a purity process. Graphite obtained from different mines and purified by different processes may produce differing characteristics, which, in turn, may affect the characteristics of an expanded graphite produced therefrom. Given a sample of graphite, methodology 60 includes the step 68 of producing an expanded graphite. The expanded graphite may be produced according to the above-described method 40, as set forth in FIG. 2 which includes acid treatment, heating, and milling to achieve a particular particle size, shape, and other characteristics.

With the expanded graphite produced, step 70 of method 60 measures various characteristics of the produced expanded graphite particles. Measurements include measuring the average particle size of the expanded graphite, which may include a $d_{50}$ average particle size measurement as taken with a Microtrac measuring device. Another measuring characteristic includes measuring the surface area of the expanded graphite particles, preferably taken as an average surface area. The bulk density, as well as real density, of the expanded graphite is also measured. Density is measured in grams per cubic inch, and may include a Scott volume. The measurement characteristics further include measuring the kerosene absorption for the expanded graphite, as well as tap density. It should be appreciated that other characteristics of the expanded graphite may likewise be measured and used in accordance with method 60.

Based on the aforementioned measured characteristics, measured data curves can be produced from which the performance for a given expanded graphite may be calculated in step 72. Measured data curves may be similar to the graphs shown in FIGS. 5–10. Based on the calculated performance for the measured expanded graphite, in step 74 a determination is made as to the optimum expanded graphite for use in the cathode 20 of cell 10 by comparing the calculated performance for various expanded graphites. For a given expanded graphite, the performance calculation may be used to adjust feedback set points, as set forth in block 76, which may be used in the production of the expanded graphite. Set point adjustments may include manual or automatic process control adjustments, such as adjusting the soaking time for acid treatment of the graphite, adjusting the time and temperature for heat treatment, and adjusting the milling speed and time used to obtain a particular expanded graphite average particle size. According to method 60, the calculated performance could be used to adjust the process of producing expanded graphite for a particular sample of graphite. Also, various samples of graphite may be used to produce the expanded graphite, and the performance characteristics can be measured and compared to determine the optimum expanded graphite from the available samples.

It will be understood by those who practice the invention and those skilled in the art, that various modifications and improvements may be made to the present invention without departing from the spirit and scope thereof as defined by the appended claims.

The invention claimed is:

1. An electrochemical cell comprising a positive electrode having an active material and an electrically conductive carbon material including expanded graphite particles having a kerosene absorption value in the range of 2.2 to 3.5 ml/g.

2. The electrochemical cell as defined in claim 1, wherein said expanded graphite particles have an average particle size in the range of 17 to 32 micrometers and a $d_{90}$ value in the range of 40 to 85 micrometers.

3. The electrochemical cell as defined in claim 2, wherein said expanded graphite particles have a $d_{10}$ value in the range of 3 to 9 micrometers.

4. The electrochemical cell as defined in claim 2, wherein said expanded graphite particles have a kerosene absorption in the range of 2.7 to 3.1 ml/g.

5. The electrochemical cell as defined in claim 2, wherein said expanded graphite particles have a surface area-to-mass ratio of at least 18 $m^2/g$.

6. The electrochemical cell as defined in claim 5, wherein said expanded graphite particles have a tap density in the range of 0.09 to 0.14 g/cc.

7. The electrochemical cell as defined in claim 6, wherein said expanded graphite particles have a Scott density of no greater than 0.07 g/ml.

8. The electrochemical cell defined in claim 2, wherein said active material of said positive electrode comprises primarily manganese dioxide.

9. The electrochemical cell defined in claim 1, wherein said expanded graphite particles are derived from natural graphite.

10. The electrochemical cell defined in claim 1, wherein said expanded graphite particles comprise 3.2 to 6.25 weight percent of the cathode.

11. The electrochemical cell as defined in claim 1, wherein said expanded graphite particles have a purity level of greater than 99.9 percent, as determined by weight loss on ignition.

12. The electrochemical cell as defined in claim 11, wherein said graphite particles have a purity level greater than 99.95%.

13. The electrochemical cell as defined in claim 11, wherein said expanded graphite particles have impurities including any of antimony, arsenic, molybdenum, vanadium, chromium, iron, copper, and tin, and wherein an aggregate total of said impurities amounts to no greater than 200 parts per million.

14. The electrochemical cell as defined in claim 11, wherein said expanded graphite particles have an average particle size in the range of 17 to 32 micrometers and a $d_{90}$ value in the range of 40 to 85 micrometers.

15. An electrochemical cell comprising a positive electrode comprising an active material and an electroconductive carbon material, the carbon material including expanded graphite particles having an average particle size in the range of 17 to 32 micrometers, a $d_{90}$ value in the range of 40 to 85 micrometers, a $d_{10}$ value in the range of 3 to 9 micrometers, a kerosene absorption value of 2.2 to 3.5 ml/g, a tap density in the range of 0.09 to 0.14 g/cc and a Scott density of no greater than 0.07 g/ml.

16. The electrochemical cell as defined in claim 15, wherein said expanded graphite particles have a purity level of greater than 99.9%, as determined by weight loss on ignition, and contain any of antimony, arsenic, molybdenum, vanadium, chromium, iron, copper, and tin as impurities, and wherein the aggregate total of said impurities is no greater than 200 parts per million.

17. The electrochemical cell as defined in claim 1, wherein the expanded graphite particles have a kerosene absorption value in the range of 2.7 to 3.1 ml/g.

18. The electrochemical cell as defined in claim 17, wherein the expanded graphite particles have a purity level greater than 99.9 percent.

19. The electrochemical cell as defined in claim 11, wherein said expanded graphite particles have a kerosene absorption value in the range of 2.7 to 3.1 ml/g.

20. The electrochemical cell as defined in claim 15, wherein the expanded graphite particles have a kerosene absorption value in the range of 2.7 to 3.1 ml/g.

* * * * *